US005363225A

United States Patent [19]

Minamihara et al.

[11] Patent Number: 5,363,225

[45] Date of Patent: Nov. 8, 1994

[54] LIQUID CRYSTAL ELEMENT AND DRIVING METHOD THEREOF INCLUDING MULTI-VALUE SIGNAL WHICH ENDS AT ZERO VOLTS

[75] Inventors: Tsugiko Minamihara, Sakai; Tomoaki Kuratate, Kobe; Toshio Matsumoto, Tenri, all of Japan

[73] Assignee: Sharp Kabushiki Kaisha, Osaka, Japan

[21] Appl. No.: 974,111

[22] Filed: Nov. 10, 1992

[30] Foreign Application Priority Data

Nov. 11, 1991 [JP] Japan ........ 3-294489

[51] Int. Cl.$^5$ ........ G02F 1/1343; G02F 1/13; G09G 3/36

[52] U.S. Cl. ........ 359/56; 359/100; 359/59; 345/92; 345/95; 345/97

[58] Field of Search ........ 359/100, 56, 59; 345/92, 95, 97

[56] References Cited

U.S. PATENT DOCUMENTS

| | | | |
|---|---|---|---|
| 4,367,924 | 1/1983 | Clark et al. | 359/100 |
| 4,930,875 | 6/1990 | Inoue et al. | 359/57 |
| 4,932,758 | 6/1990 | Hanyu et al. | 359/100 |
| 4,973,135 | 11/1990 | Okada et al. | 359/56 |
| 5,058,994 | 10/1991 | Mihara et al. | 359/56 |
| 5,182,662 | 1/1993 | Mihara | 359/56 |
| 5,189,536 | 2/1993 | Hanyu et al. | 359/100 |
| 5,200,846 | 4/1993 | Hiroki et al. | 359/57 |
| 5,218,464 | 6/1993 | Hiroki et al. | 359/59 |
| 5,227,900 | 7/1993 | Inaba et al. | 359/56 |

FOREIGN PATENT DOCUMENTS

| | | |
|---|---|---|
| 56-107216 | 8/1981 | Japan . |
| 63-231421 | 9/1988 | Japan . |
| 63-236012 | 9/1988 | Japan . |

OTHER PUBLICATIONS

"Submicrosecond bistable electro-optic switching in liquid crystals" by N. Clark et al, Applied Physics Letters, Jun. 1, 1980, vol. 36, No. 11, pp. 899-901.

*Primary Examiner*—Anita P. Gross

[57] ABSTRACT

A liquid crystal element includes a plurality of scanning electrodes, a plurality of signal electrodes, and a liquid crystal cell. The scanning and signal electrodes are formed in a matrix configuration. The liquid crystal cell has a pair of substrates provided with a switching device. The switching device has a gate-electrode and a source electrode at a crossing point of the above scanning electrodes and signal electrodes. A ferroelectric liquid crystal fills the liquid crystal cell. Furthermore, the scanning electrode is connected with the gate-electrode of the switching device, and the signal electrode is connected with the source-electrode of the switching device. The scanning electrode transmits a signal to turn on the switching device, and, simultaneously, the signal electrode transmits a multiple-value signal to drive the liquid crystal cell.

25 Claims, 11 Drawing Sheets

LIQUID CRYSTAL ELEMENT AND DRIVING METHOD THEREOF INCLUDING MULTI-VALUE SIGNAL WHICH ENDS AT ZERO VOLTS

BACKGROUND OF THE INVENTION

The present invention relates to a liquid crystal element and a method for driving the liquid crystal element, and more particularly to a liquid crystal element formed by combining a ferroelectric liquid crystal with an active matrix substrate and a driving method thereof.

DESCRIPTION OF THE RELATED ART

A liquid crystal element is widely used in watches, electronic calculators, office machines such as word processors and personal computers, portable television sets and the like.

In particular, a high-quality display element which displays a large volume of images is demanded. As a display element capable of displaying a large volume of highest quality images, there is generally known a liquid crystal display element formed by combining a twisted nematic (TN) liquid crystal with an active matrix substrate having thin film transistors (TFT) arranged in a matrix configuration.

However, a liquid crystal display of this kind has a great drawback of a narrow visual angle, which is characteristic of the TN display. As far as this display system is concerned the drawback can not be largely improved. In addition the desire to save power demands decreasing the driving voltage.

Meanwhile, a ferroelectric liquid crystal is known as a liquid crystal element having a large visual angle. In principle, the absence of a definite threshold value in the ferroelectric liquid crystal allows reducing the driving voltage with a longer pulse width for a switching device. However, normal ferroelectric liquid crystal elements have a drawback in that a high contrast cannot be obtained because of the molecular motion caused by a bias voltage.

Combining a ferroelectric liquid crystal with an active matrix substrate is considered as a means of actualizing a liquid crystal display with a wide visual angle, a reduced driving voltage, and high contrast to overcome the above drawback.

Such documents as Appl. Phys. Lett., 36, 899 (1980); Japanese Unexamined Patent Application No. 107216/1981 and U.S. Pat. No. 4,367,924 disclose ferroelectric liquid crystal elements using various liquid crystals having a chiral smectic C phase, a chiral smectic F phase and chiral smectic I phase. They disclose that sandwiching these ferroelectric liquid crystals with a helical structure in liquid crystal cells thinner than the helical pitch of the structure loosens the helical structure.

As shown in FIG. 1, liquid crystal molecules are stable in two regions wherein

⊕ represents directions of spontaneous polarization;
Z represents a normal line;
n represents the longitudinal axis of a liquid crystal molecule; and
$\theta$ represents a tilt angle. They are stable by inclining at an angle of $\Theta$ relative to a smectic layer normal line in one region while they are stable by inclining at an angle at $\Theta$ in the opposite direction thereto in the other region. Research in later years clarifies that the two regions can be created in a mixed state.

In the method therefor as shown in FIG. 1., electric potential is applied in a direction perpendicular to the paper surface, thereby producing uniform directions of liquid crystal and spontaneous polarization thereof. Besides, shifting the polarity of the applied electric fields allows switching between the two states. The switching operation causes the birefrigent light passing through the ferroelectric liquid crystal within the cell to vary. Consequently, sandwiching the above ferroelectric liquid crystal between two polarizers permits the control of transmitted light. In addition, despite the cut-off of electric fields to liquid crystal elements, the orientation of liquid crystal molecules is kept in the same state as before the cut-off of aligning force between liquid crystal and cell surface, thereby producing a memory effect. Furthermore, a direct interruption between the spontaneous polarization in liquid crystals and in electric fields demands time in an order of $\mu$ sec for driving the switching device, which results in a high response speed.

FIG. 2 shows a relation between waveforms of a voltage applied to a ferroelectric liquid crystal element and an amount of transmitted light. The ferroelectric liquid crystal element has in one of the bistable states, a longitudinal axis direction of molecules matched with the polarizing axis direction of polarizers mutually crossing at a right angle. The element is electrified with a short pulse voltage to keep memory properties. This is followed by driving the element to keep it free from the electric field, thereby actualizing a preferable switching between two values.

Subsequently, the active matrix substrate will be described. FIG. 3 shows an equivalent circuit of an active matrix type liquid crystal element using a thin film transistor (TFT) as a typical 3-terminal switching element.

Referring to FIG. 3, symbol G designates a gate electrode, S a source electrode, D designates a drain electrode, $V_{com}$ a common electrode, and LC a liquid crystal capacitor. When driving a liquid crystal, a signal is transmitted from scanning lines to apply electric field to the gate electrode, thereby turning on the TFT. Transmitting a signal from a signal line to the source electrode in synchronization with the former signal transmitted to the gate electrode results in accumulating electric charges, generating electric fields to which the liquid crystal respond.

FIG. 4 shows a conventional driving waveform produced when a ferroelectric liquid crystal is used in an active matrix type liquid crystal display. By using such a driving method, the active matrix type ferroelectric liquid crystal element can be driven.

However, in the driving method shown in FIG. 4, for example, in the absence of changes in a display of a certain pixel for a long lime, a voltage with the same polarity is applied to the ferroelectric liquid crystal of that pixel, which presents a serious problem of reliability, making it almost impossible to form a practical display element in the above driving method.

Meanwhile, a driving method as shown in FIG. 5, does not result in applying voltage exclusively with the same polarity either positive, or negative. This is preferable for the reliability of the element. However, the following problem arises in the actual display element. That is, a pulse width required for switching the typical ferroelectric liquid crystal is approximately 100 $\mu$sec at room temperature at 10 V. Although an increase in the spontaneous polarization of the ferroelectric liquid crystal is generally required to heighten the driving speed of the material. On the other hand, an increase in it makes it difficult to afford favorable bistable switching. Approximately 5 volts driving voltage is applied to the liquid crystal element for driving the TFT. The driving waveform generated when driving a liquid crystal element at 5 V a pulse width of 200 μsec required for switching. This results in a writing time per scanning line of 600 μsec. Actualizing a liquid crystal having 1000 scanning lines requires 600 msec for rewriting one screen. Reducing the driving voltage prolongs the rewriting time. This is a poor rewriting time, and has to be improved to implement a high quality active matrix type ferroelectric liquid crystal element capable of displaying a large volume of images.

SUMMARY OF THE INVENTION

The present invention provides a liquid crystal element comprising: a plurality of scanning electrodes and a plurality of signal electrodes formed in a matrix configuration; and a liquid crystal cell having a pair of substrates provided with a switching device having a gate-electrode and a source electrode at a crossing point of the above scanning electrodes and signal electrodes, and the liquid crystal cell was filled with ferroelectric liquid crystal wherein said scanning electrode is connected with the gate-electrode of the switching device, said signal electrode is connected with the source-electrode of the switching device, said scanning electrode transmits a signal to turn on the switching device and, simultaneously, said signal electrode transmits a multiple-value signal while the switching device is turned on.

Preferably, said multiple-value signal is a binary signal having a first portion of a polarity corresponding to a desired display and a second portion of 0 V. Alternately, said multiple value signal is a ternary signal having a first portion of a polarity opposite to the desired display, a second portion of a polarity corresponding to the desired display, and a third portion of 0 V.

In addition, the liquid crystal element of the present invention comprises said pair of the substrates on which said scanning electrodes and signal electrodes are selectively formed on the surface. Orientation films are formed thereon. Uniaxial orientation processing is performed so that directions of their uniaxial orientation processing may be almost parallel to each other. The said liquid crystal cell is formed by injecting said ferroelectric liquid crystal showing a chevron structure at a driving temperature as a layer structure at the chiral smectic C phase. An orientation region is generated from interaction in the uniaxial orientation processing direction and the layer structure is an inside region surrounded by a lightning defect, generated in the uniaxial orientation direction, and a hair pin defect generated behind the lightning defect. Alternately the layer structure is an outside region surrounded by the hair pin defect, generated in the uniaxial orientation direction, and a lightning defect generated behind the hair pin defect. Furthermore, the layer structure shows uniform.

As a result of the present invention, the ferroelectric liquid crystal element came to be driven in an extremely short amount of time for displaying and rewriting its screen.

Figure 6:
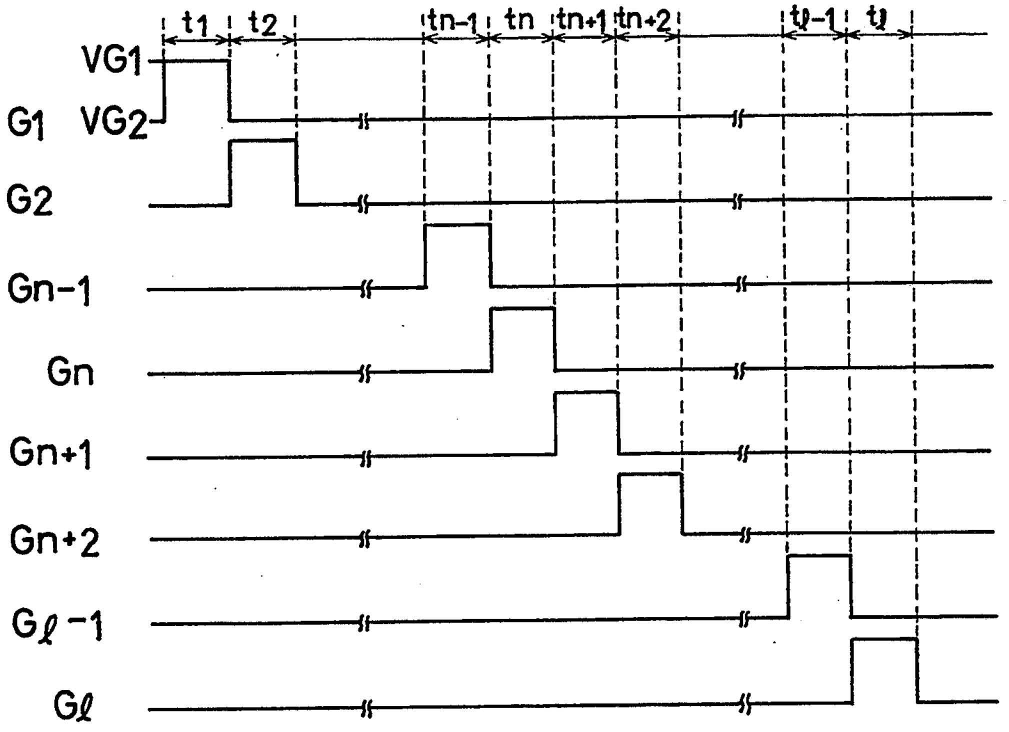
Figure 6:
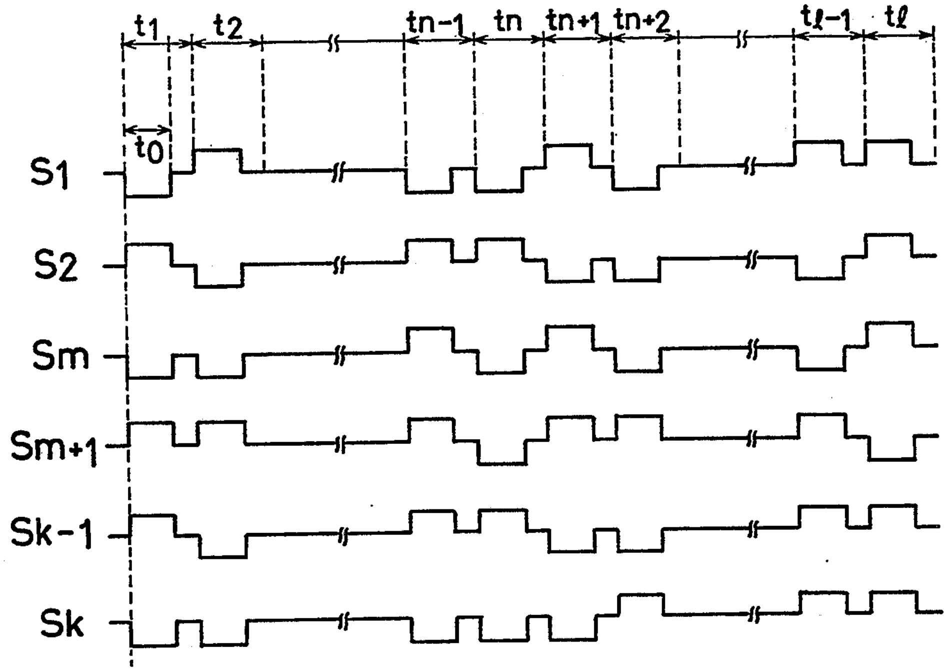
Figure 7:
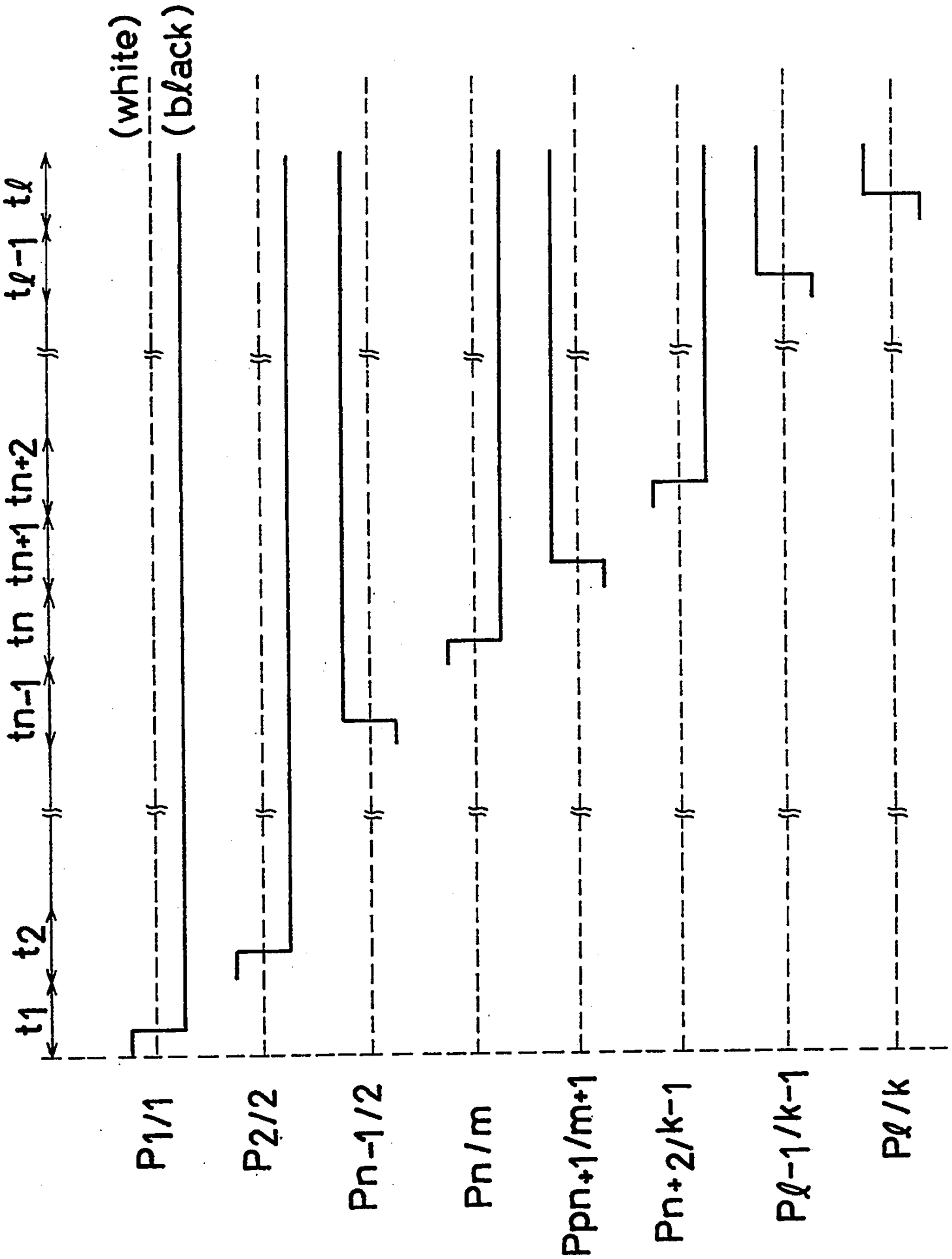
Figure 8:
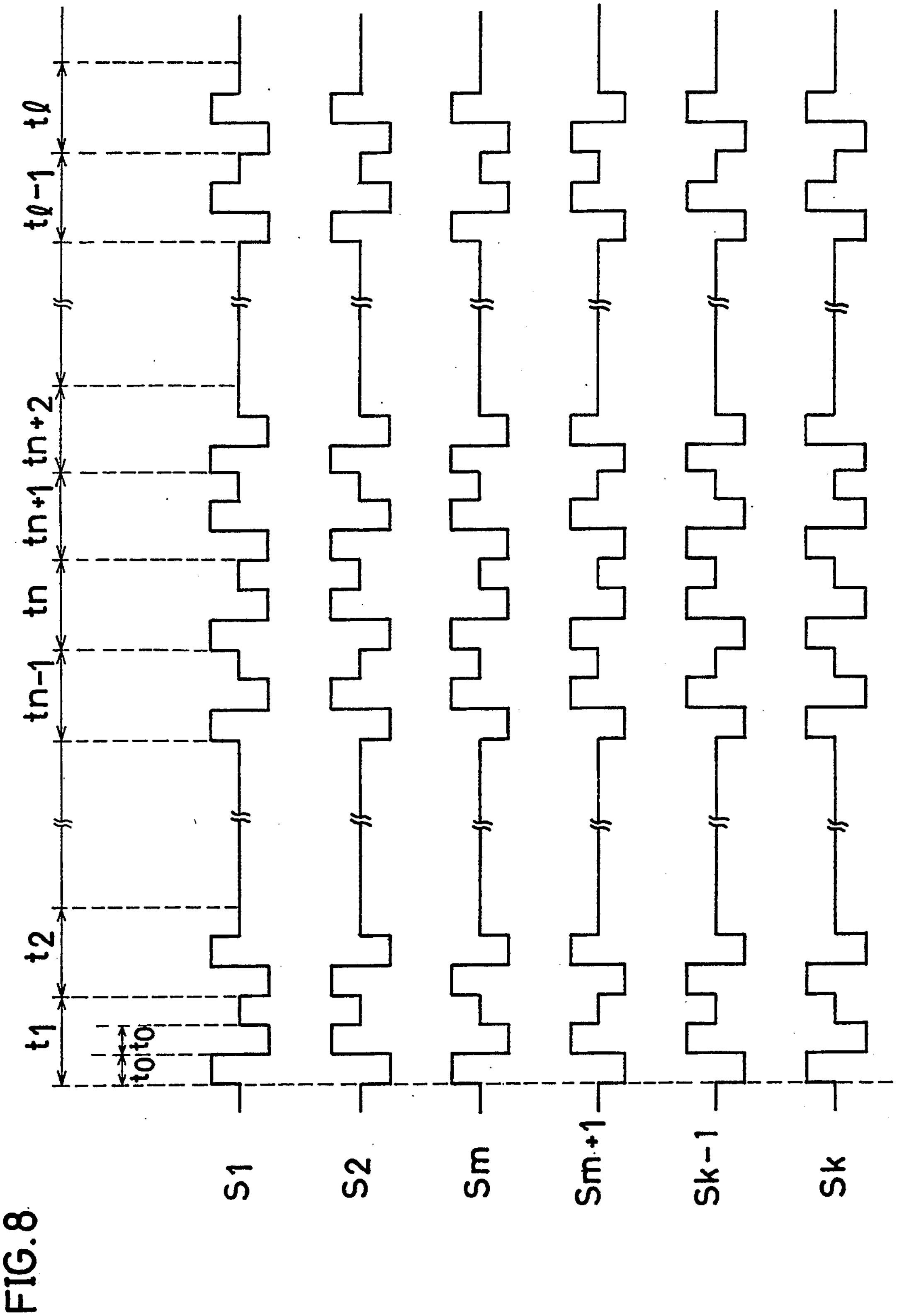
Figure 9:
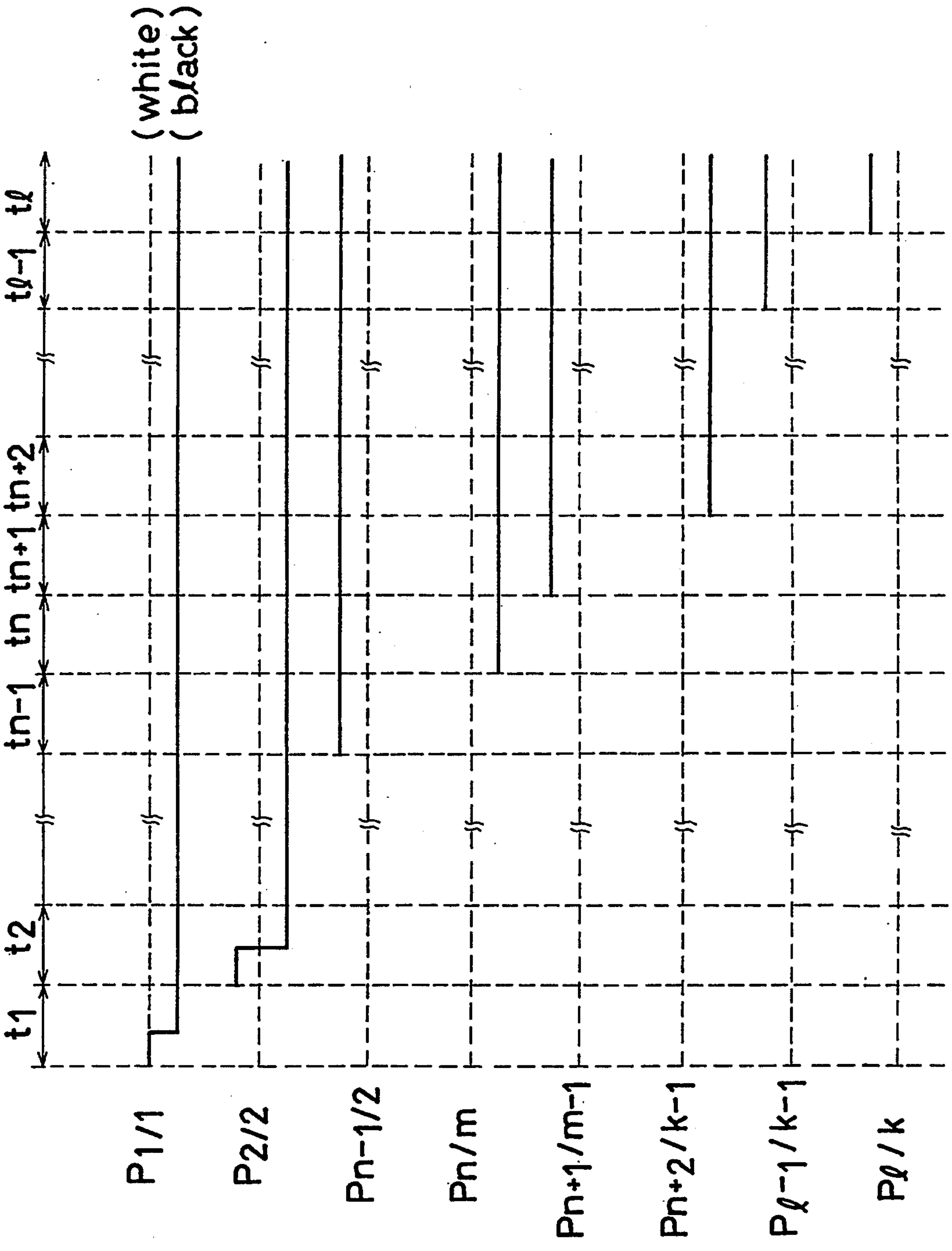
Figure 11:
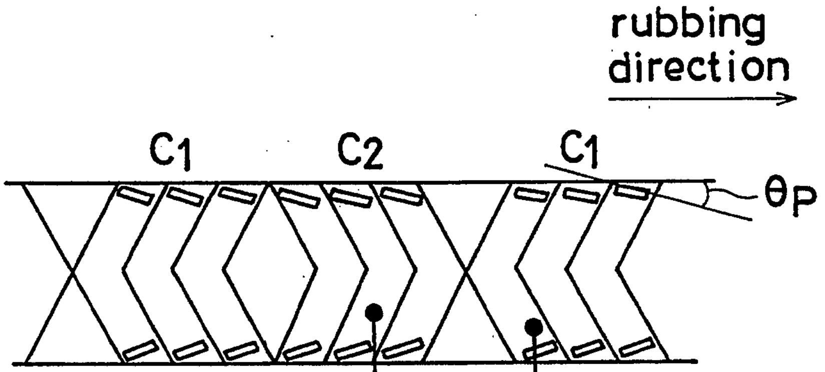
Figure 11:
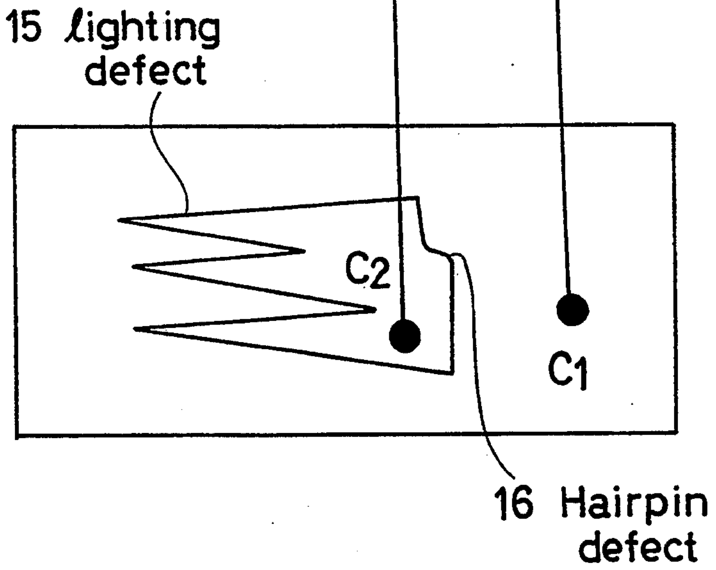

FIG, 3 is a view showing an equivalent circuit of an active matrix type liquid crystal display;

FIG, 4 is a view illustrating a conventional driving method of an active matrix type ferroelectric liquid crystal element;

FIG, 5 is a view illustrating a first active matrix type ferroelectric liquid crystal element according to the present invention;

FIGS. 6(*a*) and (*b*) illustrate a driving method according to the present invention;

FIG. 7 is a view illustrating changes in an amount of transmitted light at each pixel in the active matrix type ferroelectric liquid crystal element driven by the first driving method according to the present invention;

FIG. 8 is a view illustrating a second driving method according to the present invention;

FIG. 9 is a view illustrating changes in an amount of transmitted light at each pixel in the active matrix type ferroelectric liquid crystal element driven by the second driving method according to the present invention;

FIG, 10 is a sectional view illustrating a structure of the active matrix type ferroelectric liquid crystal element according to the present invention; and FIGS. 11(*a*) and (*b*) illustrate an orientation of a ferroelectric liquid crystal.

DETAILED DESCRIPTION OF THE INVENTION

The present invention provides an active matrix type ferroelectric liquid crystal display element with the characteristics of a large capacity, a large visual angle, a low driving voltage, a high contrast and highly reliable driving.

A method for driving a ferroelectric liquid crystal display element according to the present invention is described with reference to a liquid crystal display element shown in FIG. 5. The liquid crystal element shown in FIG. 5 comprises a ferroelectric liquid crystal including an active matrix substrate having 1 (L) scanning electrodes $G_1$, $G_2$, . . . , $G_{n-1}$, $G_{n+1}$, $G_{n+2}$, . . . $G_{n-1}$, $G_1$ and K signal electrodes $S_1$, $S_2$, . . . , $S_m$, $S_{m+1}$ . . . , $S_{k-1}$, $S_k$ formed in a matrix configuration and a thin film transistor (TFT) arranged at each intersection thereof. A gate electrode in the TFT at each intersection is connected to the scanning electrode, and a source electrode thereof is connected to the signal electrode. Symbols $P_{1/1}$, $P_{\frac{1}{2}}$, . . . , $P_{1/m}$, $P_{1/m+1}$, . . . , $P_{n/1}$, $P_{n/2}$, . . . , $P_{n/m}$, $P_{n/m+1}$, . . . shows pixels connected to a drain electrodes in the TFT formed at each intersection.

Figure 5:
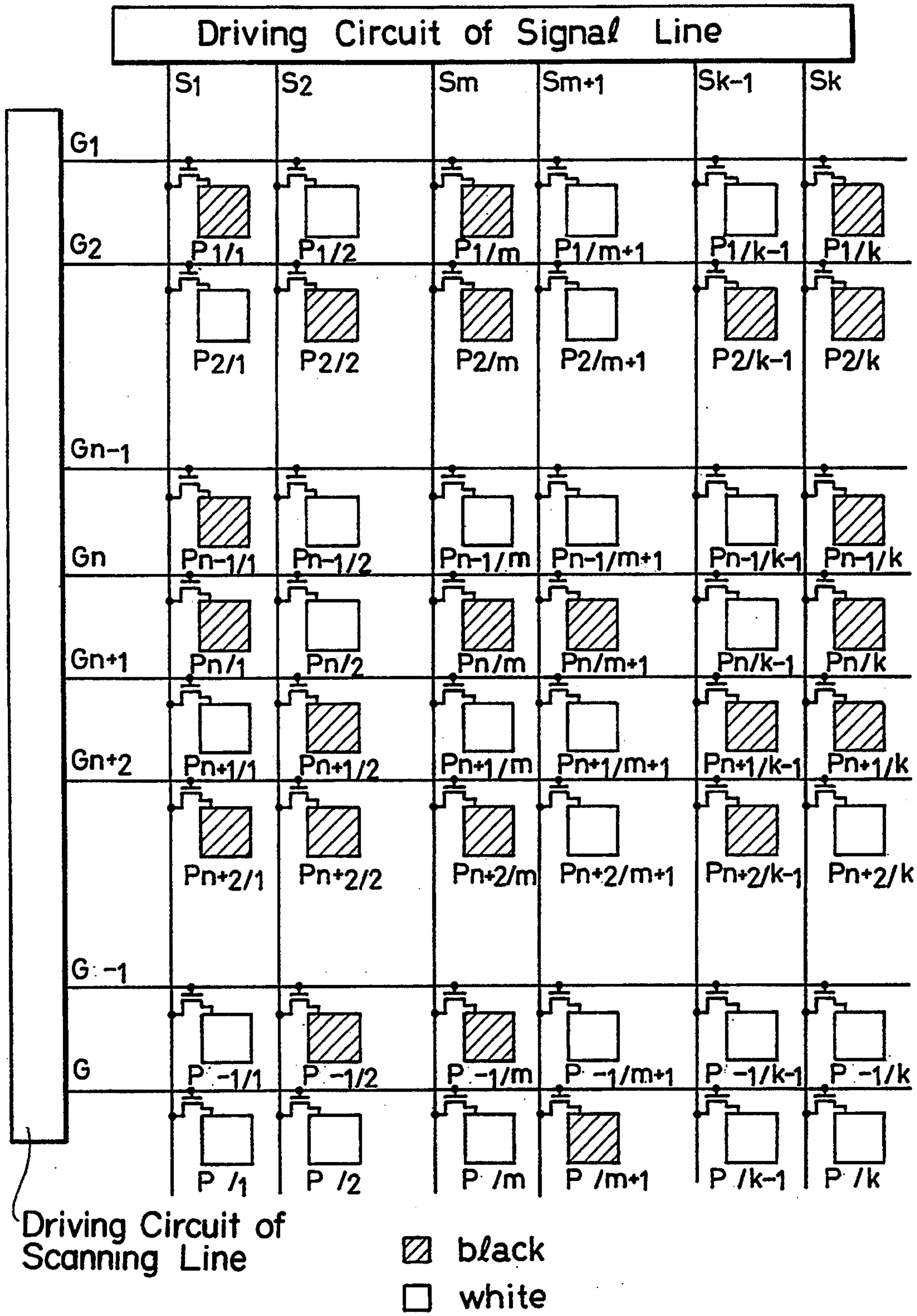

Initially, in the first method, signal waveforms shown in FIG. 6(*a*) and (*b*) are transmitted to each scanning electrode to display each pixel as shown in FIG. 5. The polarizer are disposed to display images in white upon application of a positive voltage to the ferroelectric liquid crystal, while displaying images in black upon application of a negative voltage thereto. For example, FIG. 7 shows variations in amount of transmitted light in the pixels $P_{1/1}$, $P_{2/2}$, $P_{n-\frac{1}{2}}$, $P_{n/m}$, $P_{n+1/m+1}$, $P_{n+2/k-1}$, $P_{1-1/k-1}$, and $P_{1/k}$.

During time $t_1$ the scanning electrode $G_1$ transmits a signal to turn on the TFT. Simultaneously while the TFT is turned on, a signal electrode connected to the pixels $P_{1/2}$, $P_{1/m+1}$, $P_{1/k-1}$ and the like, forming a white image among pixels connected to $G_1$, transmits a signal having a first portion with a positive voltage $V_0$ and a second portion with a 0 v. On the other hand, the signal electrode connected to pixels $P_{1/1}$, $P_{1/m}$, $P_{1/k}$ and the like forming a black image among pixels connected to $G_1$ transmits a signal having a first portion with a negative voltage $-V_0$ and a second portion with a 0 V.

Subsequently during time $t_2$ the scanning electrode $G_2$ transmits a signal to turn on the TFT. Simultaneously while the TFT is turned on, the signal electrodes transmit a binary signal consisting of a just portion having a voltage corresponding to the image to display and a second portion having 0 V. Thus, the TFT's connected to the scanning electrodes $G_3$ to $G_1$ are turned on one after another in the same manner.

Subsequently, in the second method, to display images using each pixel as shown in FIG. 5, each scanning electrode receives signals having waveforms shown in FIG. 6(*a*) and 6(*b*). At that time, disposing of polarizers in the same manner as the first method results in changes in the amount of transmitted light in the pixels $P_{1/1}$, $P_{2/2}$, $P_{n-\frac{1}{2}}$, $P_{n/m}$, $P_{n+1/m+1}$, $P_{n+2/k-1}$, and $P_{1/k}$ as shown in FIG. 9. During time $t_1$, the scanning electrode $G_1$ transmits a signal to turn on the TFT. Simultaneously, the signal electrode connected to the pixels $P_{\frac{1}{2}}$, $P_{1/m+1}$, $P_{n1/k-1}$, and the like forming a white image among the pixels connected to $G_1$ transmits a bipolar signal with a first portion having a negative voltage $-V_0$, a second portion with a positive voltage $+V_0$, and a third portion having 0 V.

On the other hand, the signal electrode connected to pixels $P_{1/1}$, $P_{1/m}$, $P_{1/k}$ and the like forming a black image among the pixels connected to $G_1$, receives a bipolar signal having a first portion with a positive voltage $+V_0$, a second portion with a negative voltage $-V_0$, and a third portion of 0 V.

Then, during time $t_2$ the $G_2$ transmits a signal to turn the TFT on. Simultaneously, the signal electrode transmits a ternary signal consisting of a first portion having a polarity opposite to the desired display, a second portion corresponding to the desired display, and a third portion 0 V. Thus, the TFT's connected to the scanning electrode $G_3$ to $G_1$ are turned on one after another in the same manner.

As described above, the first driving method of the present invention is characterized by applying voltage either positive or negative and then applying 0 V to the liquid crystal in one cycle of turning on a switching device for one cycle of writing in memory contents. At that time, positive or negative deviation in the waveforms of voltage applied to each pixel are approximately several hundreds μm. Besides, the absence of DC current applied thereto for a long time makes the element of the present invention highly reliable. In erasing images, it is possible to apply a cancel voltage to erase the accumulated DC current component.

The second driving method of the present invention is characterized by transmitting a ternary signal to a liquid crystal in one cycle of turning on a switching device for one cycle of writing in display contents. The ternary signal consists of a first portion having a polarity opposite that required for turning the liquid crystal the desired color, a second signal portion having a polarity required to turn the liquid crystal the desired color, and a third signal portion of 0 V.

The second driving method, compared with the first, requires a larger amount of time to rewrite the display contents owing to a signal opposite to the display transmitted thereto. However, DC current is completely erased, which results in improved reliability. Although time for applying a signal with an opposite polarity is additionally required in the rewriting time, in the second driving method, as compared with the first driving method, since the direct current component is completely canceled, it is preferable in view of reliability.

The supply voltage $V_s$ varies from one specification of liquid crystal driving LSI to another. For example 5 V may be used. In the first method, a value $t_1$ is defined as (time $t_0$ required for switching the ferroelectric liquid crystal)+(time for applying 0 V thereto). For example, a typical ferroelectric liquid crystal requires a 10 V pulse width of approximately 100 μsec for switching. Thus, the pulse width increases to 200 $\mu sec+\alpha$ ($\alpha>0$). When $\alpha$ is given as 25 μsec, the total time value is approximately 225 μsec. With 1 (L)=1000, 225 μsec or more is needed to rewrite one screen image.

In the second method, a value $t_1$ is defined as (time $t_0$ required for switching the ferroelectric liquid crystal)×2+(time for applying 0 V thereto). Like the first method, a typical ferroelectric liquid crystal requires a 10 V pulse width of approximately 100 μsec for switching. Thus the total pulse width is 200 $\mu sec+\alpha$. At 5 V, the total time is 400 $\mu sec+\alpha$. When 25 μsec is temporarily given as $\alpha$. With 1 (L)=1000, 400 μsec or more is needed for rewriting one screen.

The rewriting time cannot be regarded as fast at all. The driving methods of the present invention can be applied to a partial rewriting method in which a signal is transmitted only to part on the screen which needs rewriting. In this case, only scanning-electrodes and signal electrodes connected to pixels for images which needs to be rewritten receives signals, thereby presenting no serious problem in displaying images.

In addition, applying voltage to opposite electrodes allows the adjustment of voltage applied to the ferroelectric liquid crystal.

As a switching element is provided at each intersection of the scanning electrode and the signal electrode, various elements can be actualized. For example, a TFT using amorphous-Si or poly-Si, a Laddic device or a plasma address type element can be actualized. In particular, the TFT using amorphous-Si or poly-Si is preferable.

Figure 10:
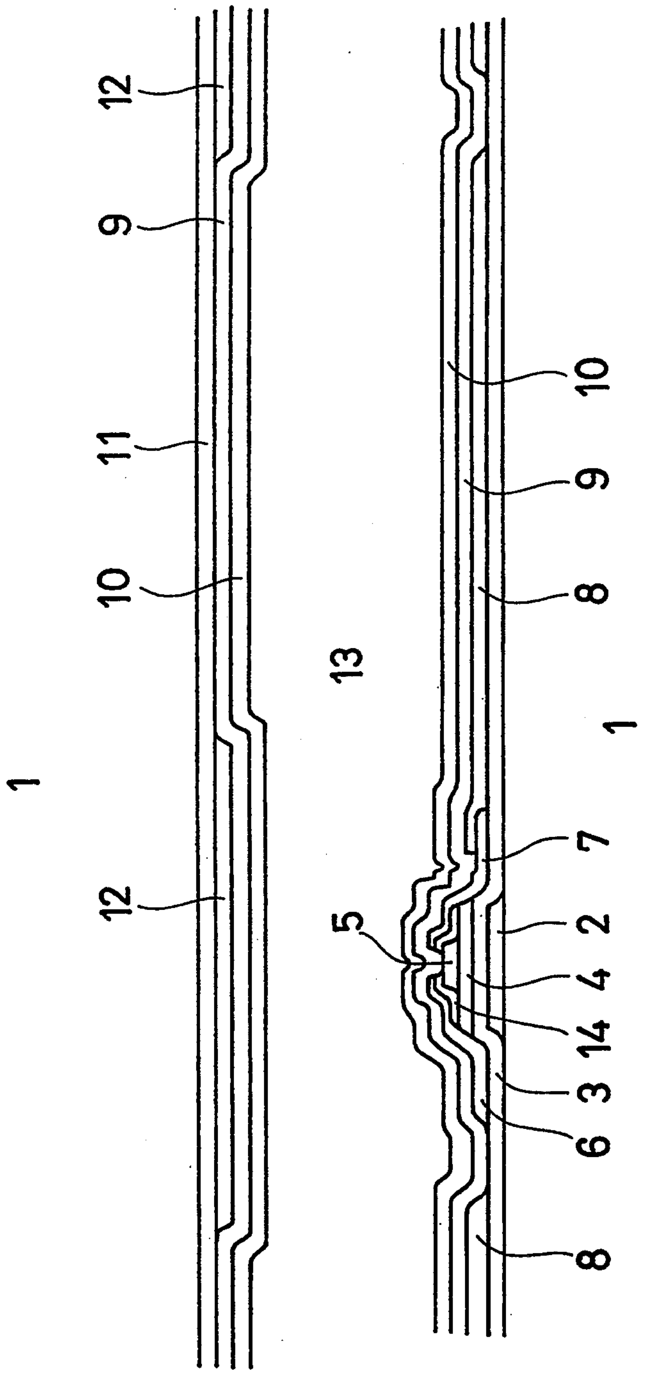

FIG. 10 is a sectional view illustrating an example of the liquid crystal element according to the present invention. The element is formed by combining the active matrix substrate using amorphous-silicon TFT with the ferroelectric liquid crystal. Referring to the FIG. 10, reference numeral 1 designates a substrate, 2 a gate electrode, 3 a gate insulating film, 4 an amorphous-silicon semiconductor film, 14 an $n^+$-amorphous-silicon film doped with phosphorus, 5 an insulating film, 6 a source electrode, 7 a drain electrode, 8 designates a pixel electrode, 9 designates an insulating film, 10 an orientation film, 11 a common electrode, 12 an opaque film, and 13 a ferroelectric liquid crystal. Although the opaque film 12 is not necessarily needed, it serves as a black matrix shielding the light at a part except for the pixels and preventing the ferroelectric liquid crystal from reverting upon the disappearance of electric field. Uniaxial orientation processing is performed on at least one of the orientation films 10 on two substrates. Although FIG. 10 shows an example of an element in a black and white display, a color display is actualized by forming a color filter on the substrate. The orientation film 10 and the ferroelectric liquid crystal is actualized by forming a color filter on the substrate. The orientation film 10 and the ferroelectric liquid crystal 14 may be formed of several kinds of materials including those already known it is preferable to use a material and element structure capable of producing a high contrast in the element of the present invention.

As one preferable example, there will be described a liquid crystal element having a pair of substrates whose uniaxial orientation processing directions are parallel to each other. A driven liquid crystal exhibits a chiral smectic C phase, and has a smectic layer structure in the chiral smectic C phase forming a chevron structure. The element is characterized by using, with a driving temperature range, a uniform orientation state. The uniform orientation state is produced either inside of a region surrounded by a lightening defect, generated in the uniaxial orientation direction, and a hair pin defect generated behind the lightening defect. Alternatively, the uniform orientation state is produced outside of a region surrounded by a hair pin defect, generated in the uniaxial direction, and a lightening defect, generated behind the hair pin defect.

In general, the chiral smectic C phase is said to exhibit a layered structure called a chevron structure as shown in FIG. 11(*a*). There are two chevron directions as shown in FIG. 11(*b*). At a point where chevron directions of the layer change, an orientation defect called a zigzag defect is produced. FIG. 11(*b*) is a schematic view showing the zigzag defect observed through a polarization microscope. The zigzag defect falls into two kinds; a lightening defect and a hair pin defect. It has been found that the lightning defect corresponds to the layer structure of <<>> while the hair pin defect corresponds to the layer structure >><< (N.Hiji et al., Jpn. J. Appl. Phys., 27, L1 (1988)). FIG. 11 shows a relation between a rubbing direction and a pretilt angle $\Theta_p$. The above two orientations are called respectively C1 orientation and C2 orientation in view of the relation with the rubbing direction (Refer to Kanbe's articles on p 18–26, Lecture Articles Presented at a Special Meeting of the Society of Electronic information and Communications Entitled "Optoelectronics; Liquid Crystal Display and Related Material" January, 1990). When a rubbing axis runs in the same direction as the chevron direction of the layer, the orientation is defined as C1 (chevron 1). When the rubbing axis runs in the direction opposite to the chevron direction, the orientation is defined as C2 (chevron 2).

Figure 1:
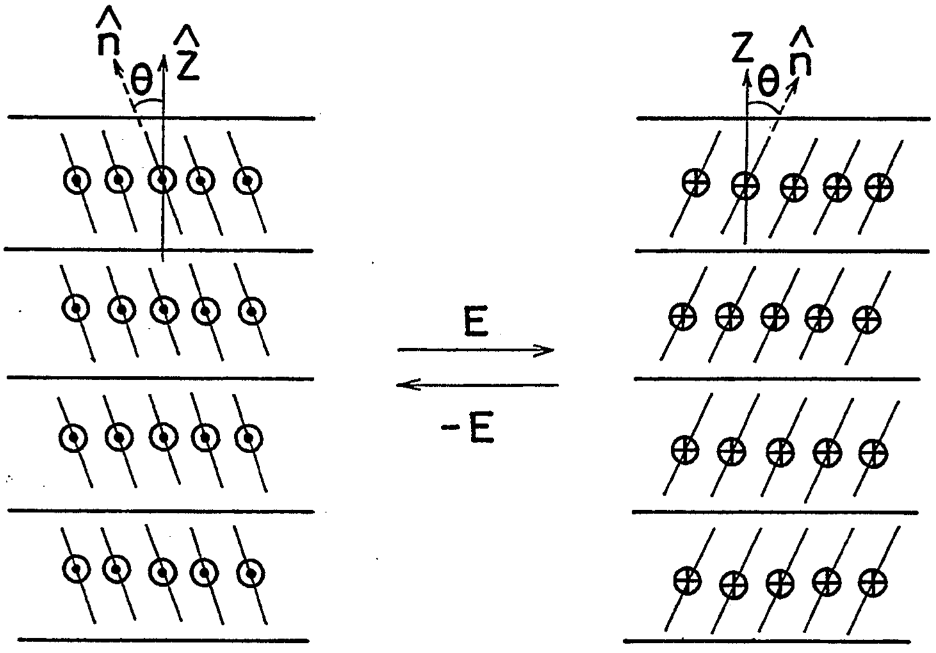
FIG.1 PRIOR ART
FIG. 1 is a schematic view illustrating a switching of a ferroelectric liquid crystal element.
Figure 2:
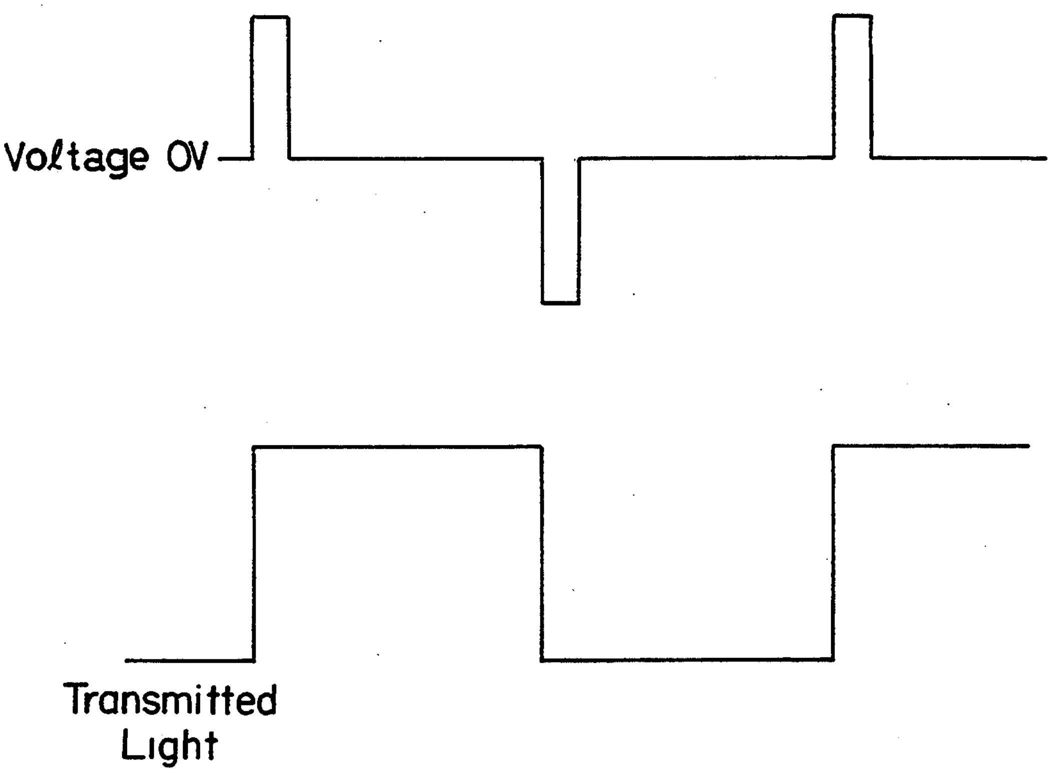
FIG.2 PRIOR ART
FIG. 2 is a view illustrating relations between the applied voltage and changes in an amount of transmitted light in the ferroelectric liquid crystal element.
Figure 3:
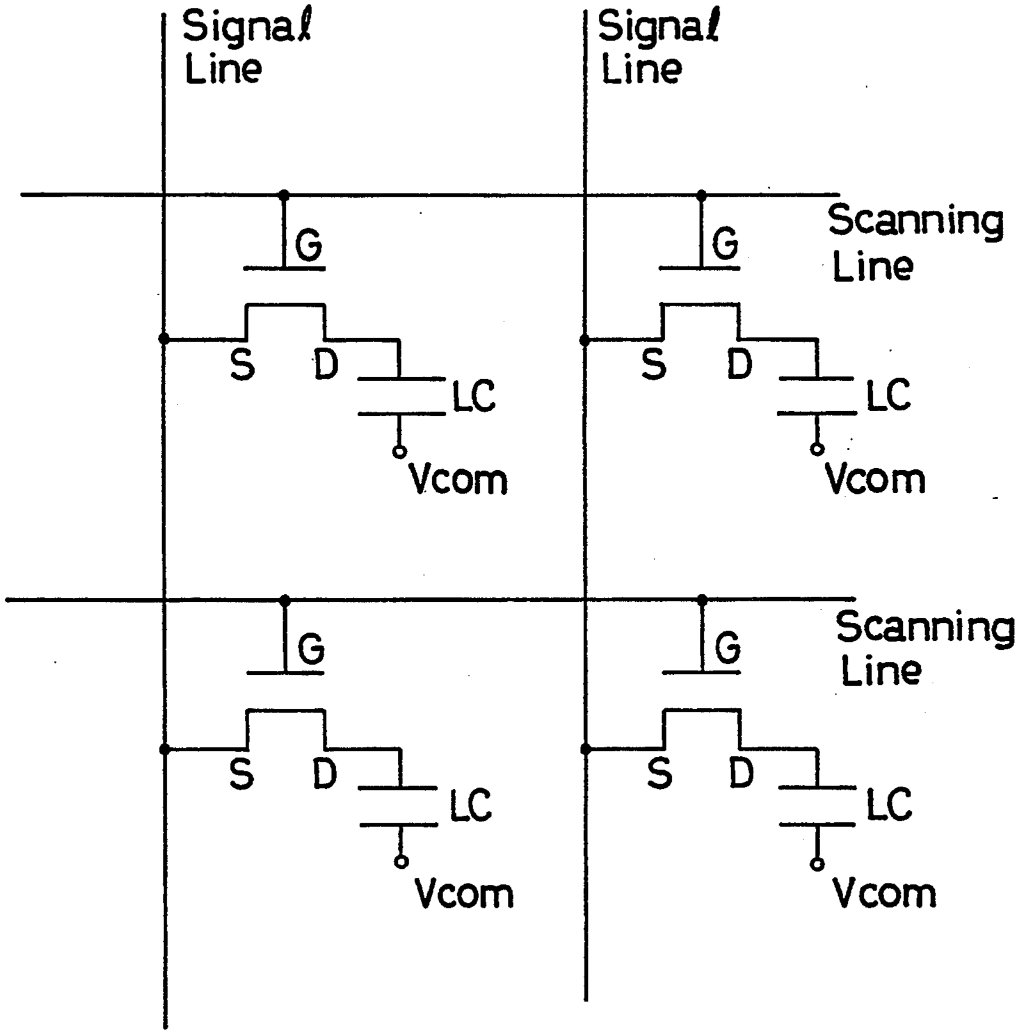
FIG. 3 PRIOR ART
Figure 4:
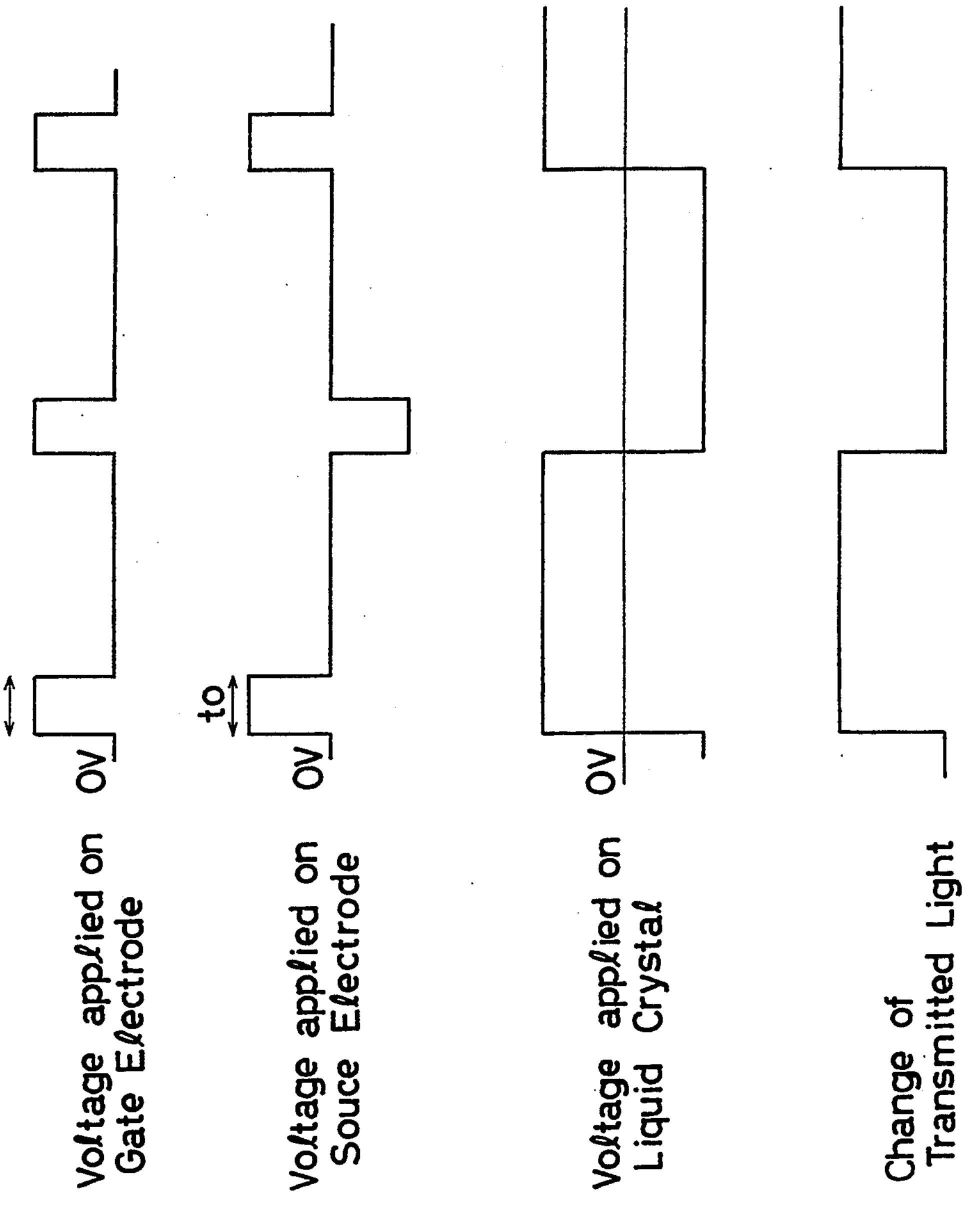
FIG.4 PRIOR ART

By the way, enlarging the pretilt angle results in a conspicuous distinction in the orientation states between C1 and C2 orientation. when the orientation film having a large pretilt angle of 8° or more (normally 8° to 30°) is used, there are observed in the C1 orientation, at the higher temperature, a region with a definite quenching position exhibited as well as a region with no quenching position exhibited. Meanwhile, there is observed only a region with a definite quenching position exhibited in the C2 orientation at the lower temperature. Since it is generally accepted that the presence of a quenching position distinguishes a uniform orientation from a twist orientation ("Structure and Physical Properties of Ferroelectric liquid Crystal" by Fukuda and Taketoe, Corona Co., 1990, pp.327), one exhibiting a quenching position at the Cl orientation is called C1U (Cl uniform) orientation while one exhibiting no quenching position at the C1 orientation is called C1T (Cl twist) orientation. Meanwhile only one kind of orientation is provided in the C2 orientation. When the voltage waveforms shown in FIG. 2 are applied, preferable contrast can be obtained in the C1U orientation and C2 orientation, while low contrast is provided in the ClT orientation. Since the contrast has the following properties, the C1U orientation is especially preferable in view of contrast.

C1U>C2>>C1T

At a not so large pretilt angle $\Theta_p$, a difference in contrast between the C1U orientation and the C2 orientation is not so large. Therefore, both of the C1U orientation and C2 orientation can be used in the element of the present invention regardless of the angle $\Theta_p$.

EXAMPLES

Example 1

Liquid crystal compositions No. 201 to 203 having compositions shown in Chemical Formula was prepared using compounds No. 101 to 128 shown in the following Table. The compositions exhibited the smectic C phase at the room temperature. Table 2 shows phase transition temperature in these compositions.

Referring to the drawings, symbol C designates a crystal phase, $S_X$ a smectic X phase, $S_C$ a smectic C phase, $S_A$ a smectic A phase, and I an isotropic liquid phase.

| | | Phase Transition Temperature (°C.) | | | | | |
|---|---|---|---|---|---|---|---|
| | | C | $S_X$ | $S_C$ | $S_A$ | N | I |
| No. 101 | 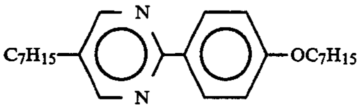 | .38 | — | — | .47 | .67 | . |
| No. 102 | 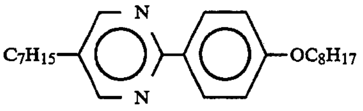 | .49 | — | — | (.44) | .70 | . |
| No. 103 | 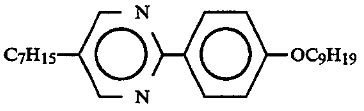 | .46 | — | .51 | .57 | .70 | . |

-continued
| No. | Compound | C | $S_x$ | $S_c$ | $S_A$ | N | I |
|---|---|---|---|---|---|---|---|
| | | Phase Transition Temperature (°C.) | | | | | |
| No. 104 | 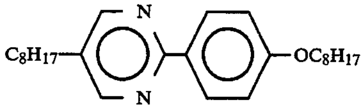 | .29 | — | .56 | .62 | .68 | . |
| No. 105 | 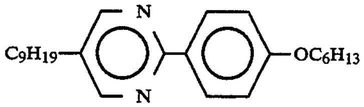 | .24 | — | .43 | .70 | .71 | . |
| No. 106 | 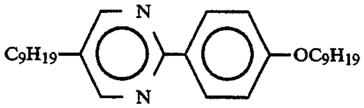 | .35 | — | .60 | .75 | — | . |
| No. 107 | 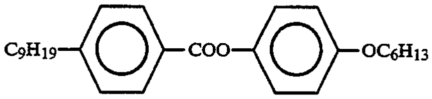 | .41 | — | (.37) | — | .64 | . |
| No. 108 | 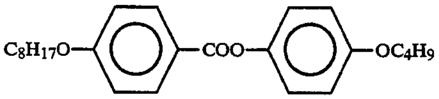 | .58 | — | .60 | — | .89 | . |
| No. 109 | 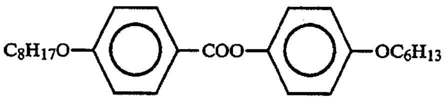 | .55 | — | .66 | — | .90 | . |
| No. 110 | 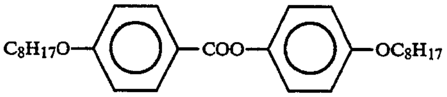 | .61 | — | .73 | — | .90 | . |
| No. 111 | 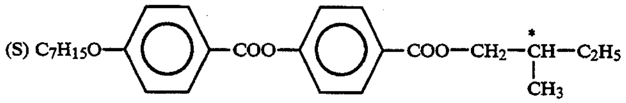 | .35 | — | (.19) | .53 | — | . |
| No. 112 | 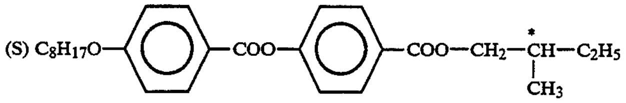 | .33 | — | (.32) | .58 | — | . |
| No. 113 | 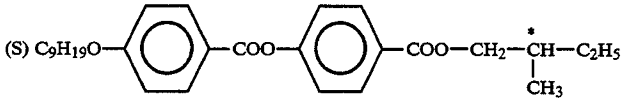 | .56 | — | (.32) | .57 | — | . |
| No. 114 | 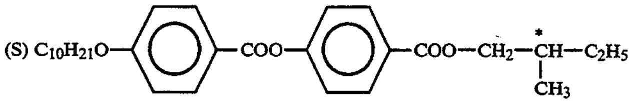 | .52 | — | (.35) | .60 | — | . |
| No. 115 | 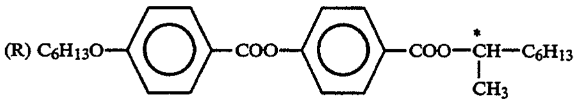 | .48 | — | — | — | — | . |

-continued
| | | Phase Transition Temperature (°C.) | | | | | |
|---|---|---|---|---|---|---|---|
| | | C | $S_x$ | $S_c$ | $S_A$ | N | I |
| No. 116 | 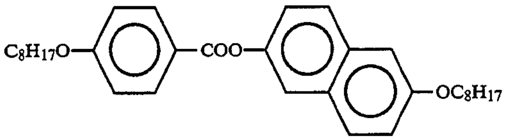 | .70 | — | .83 | — | .132 | . |
| No. 117 | 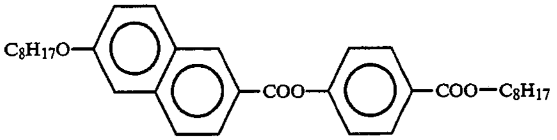 | .90 | — | — | .110 | — | . |
| No. 118 | 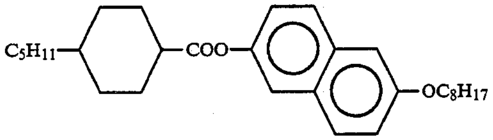 | .55 | — | (.45) | .104 | .116 | . |
| No. 119 | 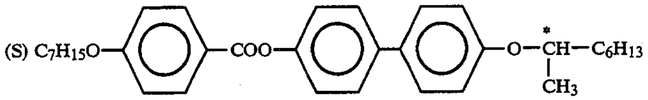 | .76 | (.54) | .92 | — | .125 | . |
| No. 120 | 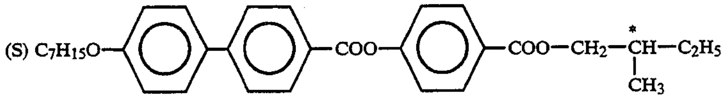 | .62 | — | .139 | .191 | — | . |
| No. 121 | 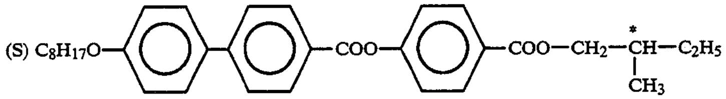 | .76 | — | .144 | .188 | — | . |
| No. 122 | 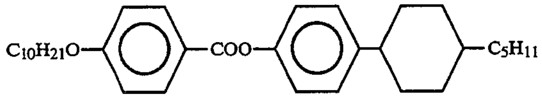 | .73 | — | .120 | .127 | .170 | . |
| No. 123 | 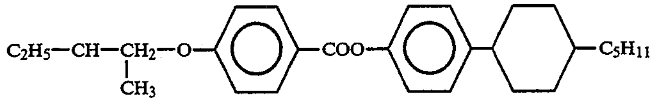 | .97 | — | — | — | .164 | . |
| No. 124 | 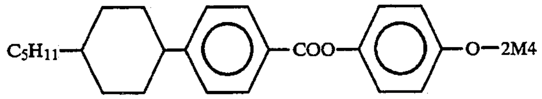 | .105 | — | — | .149 | .164 | . |
| No. 125 | 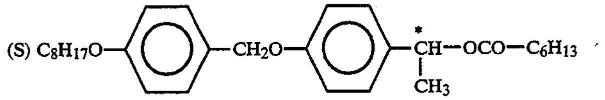 | .53 | — | — | — | — | . |
| No. 126 | 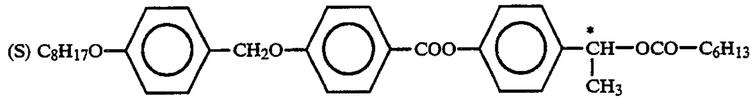 | .110 | — | — | — | — | . |
| No. 127 | 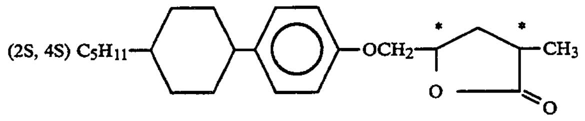 | .101 | — | — | (.54) | — | . |

-continued

| | Phase Transition Temperature (°C.) | | | | | |
|---|---|---|---|---|---|---|
| | C | $S_x$ | $S_c$ | $S_A$ | N | I |
| No. 128 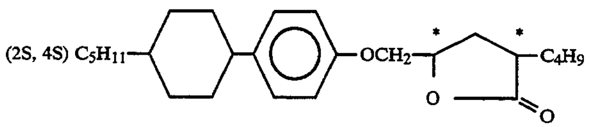 | .84 | — | — | — | — | . |

C: Crystal Phase
$S_x$: Smectic X phase
$S_C$: Smectic C phase

TABLE 1

| Ferroelectric Liquid Crystal Compositions | | | |
|---|---|---|---|
| Compounds | Composition No. 201 | Composition No. 202 | Composition No. 203 |
| No. 101 | | 10.0 | |
| No. 102 | | 5.0 | |
| No. 103 | | 16.0 | |
| No. 104 | | 10.0 | |
| No. 105 | | 13.0 | |
| No. 106 | | 44.0 | |
| No. 107 | | | 24.0 |
| No. 108 | | | 12.2 |
| No. 109 | | | 12.5 |
| No. 110 | | | 11.9 |
| No. 111 | 9.4 | | |
| No. 112 | 29.4 | | |
| No. 113 | 10.6 | | |
| No. 114 | 9.5 | | |
| No. 115 | | | 1.4 |
| No. 116 | | | 4.7 |
| No. 117 | 4.8 | | 3.4 |
| No. 118 | | | 4.8 |
| No. 119 | | | 1.2 |
| No. 120 | 19.4 | | |
| No. 121 | 14.9 | | |
| No. 122 | | | 8.0 |
| No. 123 | | | 6.4 |
| No. 124 | | | 6.4 |
| No. 125 | | | 1.2 |
| No. 126 | | | 1.0 |
| No. 127 | | 2.0 | |
| No. 128 | 2.0 | | |

TABLE 2

| Pretilt Angles | |
|---|---|
| Orientation Film | Pretilt Angles |
| PS-X-A-2001 (manufactured by Chisso Petrochemical Co. Ltd.) | 12-15° C. |
| PS-X-S-014 (manufactured by Chisso Petrochemical Co. Ltd.) | 1-2° C. |
| PVA | 0.5° C. |

An ITO film was formed on each of two glass substrates and a polyimide orientation film (LX-1400 made by Hitachi Chemical Co., Ltd.) was coated on each of them to be rubbed.

Then, the two glass substrates were laminated to each other so that they can be rubbed in the same direction and in a cell thickness of 2 μm. Then the ferroelectric liquid crystal compositions shown in Table 1 were charged thereto. Then, the cell was heated to a temperature at which the liquid crystal compositions changed to isotropic liquid and then cooled down to room temperature at 1° C./min, thereby giving the ferroelectric liquid crystal element having a preferable orientation. Then, the ferroelectric liquid crystal element is disposed between polarizers crossing at right angles to measure response time, a tilt angle, a memory angle and a memory pulse width. Table 2 shows the results of the measurement. The response time is defined by measuring time required for the amount of transmitted light to increase from 0 to 50%, 0 to 90% and 10 to 90%, from the application of short waveform voltage of ±10 v at 25° C. The tilt angle is defined as ½ of an angle formed between two quenching positions provided when the square waveform voltage is applied to the cell. The memory angle is defined as an angle formed between the two quenching positions provided when the electric field is not applied to the cell. In addition, the memory pulse width is defined as the minimum pulse width which permits switching by applying a pulse waveform voltage of ±10 V at 25° C.

Example 2

An 1000 Å thick ITO film was formed on each of the two glass substrates, followed by forming a 500 Å thick $SiO_2$ insulating film. An orientation film shown in table 2 was further formed to grow it to a thickness of 400 Å by spin coating. Subsequently the film was rubbed with a rayon cloth in uniaxial orientation processing. The substrates were laminated to each other in the thickness of 20 μm so that the rubbing direction in one substrate deviates from a parallel line from the rubbing direction in the other, thereby forming a liquid crystal cell. Then, a Merck Co.-made nematic liquid crystal E-8 was charged thereto, followed by measuring liquid crystal molecules from the substrate using a magnetic field capacity method. The results are shown in Table 3.

TABLE 3

| Comp. | Phase Transition Temperature (°C.)$S_C$ | $S_A$ | N | I | Response Speed (μsec) 0-50% | 0-90% | 10-90% |
|---|---|---|---|---|---|---|---|
| No. 201 | .40 | .95 | — | . | 172 | 254 | 154 |
| No. 202 | .44 | .68 | .70 | . | 111 | 175 | 114 |
| No. 203 | .42 | .75 | .91 | . | 426 | 875 | 650 |

| Comp. | Tilt Angle (deg) | Memory Angle (deg) | Memory pulse Width |
|---|---|---|---|
| No. 201 | 15 | 9 | 180 |
| No. 202 | 11 | 9 | 100 |
| No. 203 | 19 | 10 | 350 |

Example 3

An active matrix type ferroelectric liquid crystal element having a structure shown in FIG. 10 was formed in the following process. A Ta film was formed on a substrate 1 formed of glass by sputtering to pattern it into a predetermined configuration, whereby 64 gate electrodes 2 were formed. A gate insulating film (SiNx film) 3, an (SiNx film) 5 were sequentially laminated by plasma CVD under reduced pressure to patterns. the insulating film 5 into a predetermined configuration. Then, a phosphorus-doped N+-amorphous-silicon film 14 formed by the plasma CVD, to pattern the n+-amorphous-silicon film and the semiconductor film 4. Then, a Ti film was formed by sputtering to pattern the Ti film and the n+-amorphous-silicon film 14 into a predetermined configuration, whereby 64 source electrodes 6 and drain electrodes 7 were formed. An ITO film was formed by sputtering to pattern it, whereby a pixel electrode 8 was formed.

The ITO film serving as a common electrode 11 was formed on another substrate by sputtering and then a Mo film serving as an opaque film 12 was formed by sputtering, followed by patterning it into a predetermined configuration.

A 500 Å thick $SiO_2$ insulating film was formed on each of the above substrates. Then, as an 400 Å thick orientation film a PSI-X-A-2001 (polyimide made by Chisso Petrochemical Co., Ltd) was formed by spin coating to rub the film with a rayon cloth in the uniaxial processing. Then the two substrates were laminated to each other so that the rubbing direction in one substrate might coincide with the other through a silica beads spacer at intervals of 2 μm using a epoxy resin sealing material. The ferroelectric liquid crystal composition No. 201 formed in the example 1 was charged to form an inlet between the substrates by charging technique, curing the inlet with an acrylic UV curing resin to form, a liquid crystal cell. Then, a polarizer having polarizing axes crossing at right angles was arranged on upper and lower surfaces of the cell so that one polarizing axis coincides with either one of optical axes of the liquid crystal of the cell, thereby providing a liquid crystal display.

The ferroelectric liquid crystal element thus formed had a C1U orientation on the whole surface except for a region of the C2 orientation surrounded by fine zigzag defects in a temperature region from a smectic C-smectic A transition point to room temperature.

The ferroelectric liquid crystal element was driven by the driving method shown in FIG. 7, when it was driven at 25° C. under $V_{G1}=10$ V, $V_{G2}=-15$ V, $V_S=5$ V, $t_0=360$ μsec, and $t_1=385$ μsec, a preferable display requiring only 24.6 msec for rewriting one screen was provided.

Example 4

An active matrix type ferroelectric liquid crystal element having a structure shown in FIG. 10 was formed in the same manner as in the example 3 except that the liquid crystal composition No. 202 was used in the place of the liquid crystal composition No. 201 used in Example 3.

The ferroelectric liquid crystal had a C1U orientation on the whole surface except for a region of the C2 orientation surrounded by small zigzag defects in a temperature region from a smectic C-smectic A transition point to room temperature.

The ferroelectric liquid crystal element was driven by the driving method shown in FIG. 6. Although it was driven at 25° C. under $V_{G1}=10$ V, $V_{G2}=-15$ V, and $V_S=5$ V using various values of $t_1$, bistable switching was not provided. However, it could be driven at 33° C. or more, for example, when it was driven at 35° C. under the conditions $V_{G1}=10$ V, $V_{G2}=-15$ V, $V_S=5$ V, and $t_0=14.4$ msec for rewriting one screen.

Example 5

An active matrix type ferroelectric liquid crystal element having a structure shown in FIG. 10 was formed in the same manner as in Example 3 except that the liquid crystal composition No. 202 was used in the place of the liquid crystal composition No. 201 used in Example 3 and an orientation film PSI-X-S-04 (polyimide made by Chisso Petrochemical Co., Ltd.) was used in the place of the orientation film SI-X-A-2001 (polyimide made by Chisso Petrochemical Co., Ltd.).

The ferroelectric liquid crystal element had C2 orientation on the whole surface except for a region of the C1 orientation surrounded by fine zigzag defects at room temperature.

The ferroelectric liquid crystal element was driven by the driving method shown in FIG. 6. When it was driven at 25° C. under $V_{G1}=10$ V, $V_{G2}=-15$ V, $V_S=5$ V, $t_0=200$ μsec, and $t_1=225$ μsec, a preferable display requiring only 14.6 msec for rewriting one screen was provided.

Example 6

An active matrix type ferroelectric liquid crystal element having a structure shown in FIG. 10 was formed in the same manner as in Example 3 except that the liquid crystal composition No. 203 was used in the place of the liquid crystal composition No. 201 used in Example 3.

The ferroelectric liquid crystal element had C2 orientation of the whole surface except for a region of the C1 orientation surrounded by fine zigzag defects at room temperature.

The ferroelectric liquid crystal element was driven by the driving method shown in FIG. 6. When it was driven at 25° C. under $V_{G1}=10$ V, $V_{G2}=-15$ V, VS=5 V, t0=700 μsec, and $t_1=725$ μsec, a preferable display requiring only 46.4 msec for rewriting one screen was provided.

Example 7

An active matrix type ferroelectric liquid crystal element having a structure shown in FIG. 10 was formed in the same manner as in Example 3 except that the liquid crystal composition No. 203 was used in the place of the liquid crystal composition No. 201 used in Example 3 and the PVA was used in the place of the orientation film PSI-X-A-2001 (polyimide made by Chisso Petrochemical Co., Ltd.).

The ferroelectric liquid crystal element had C2 orientation on the whole surface except for a region of C1 orientation surrounded by fine zigzag defects at the room temperature.

The ferroelectric liquid crystal element was driven by the driving method shown in FIG. 6. When it was driven at 25° C. under $V_{G1}=10$ V, $V_{G2}=-15$ V, $V_S=5$ V, $t_0=700$ μsec, and $t_1=725$ μsec, a preferable display requiring only 46.4 msec for rewriting one screen, 46.4 msec was provided.

Example 8

The ferroelectric liquid crystal element formed in Example 4 was driven by the driving method shown in FIG. 8 under condition shown below. When it was driven at 25° C. under $V_{G1}=10$ V, $V_{G2}=-15$ V, $V_S=5$ V, $t_0=360$ μsec, and $t_1=745$ μsec, a preferable display requiring only 47.7 msec for rewriting one screen was provided.

Example 9

The ferroelectric liquid crystal element formed in Example 4 was driven by the driving method shown in FIG. 8 under condition shown below.

Although it was driven at 25° C. under $V_{G1}=10$ V, $V_{G2}=-15$ V, and $V_S=5$ V using various values of $t_1$, no bistable switching was provided. However, it could be driven at 33° C. or more. For example, when it was driven at 35° under $V_{G1}=10$ V, $V_{G2}=-15$ V, $V_S=5$ V, $t_0=200$ μsec, a preferable display requiring only 27.2 msec for rewriting one screen was provided.

Example 10

The ferroelectric liquid crystal element formed in Example 5 was driven by the driving method shown in FIG. 8 under conditions shown below.

When it was driven at 25° C. under $V_{G1S}=10$ V, $V_{G2}=-15$ V, $V_S=5$ V, $t_0=200$ μsec, $t_1=425$ μsec, a preferable display requiring only 27.2 msec for rewriting one screen was provided.

Example 11

The ferroelectric liquid crystal element formed in Example 6 was driven by the driving method shown in FIG. 8 under conditions shown below.

When it was driven at 25° C. under $V_{G1}=10$ V, $V_{G2}=-15$ V, $V_S=5$ V, $t_0=700$ μsec and $t_1=1425$ μsec, a preferable display requiring only 91.2 msec for rewriting one screen was provided.

Example 12

The ferroelectric liquid crystal display element formed in Example 7 was driven by the driving method shown in FIG. 8 under conditions below.

When it was driven at 25° C. under $V_{G1}=10$ V, $V_{G2}=-15$ V, $V_S=5$ V, $t_0=700$ μsec and $t_1=1425$ μsec, a preferable display requiring only 91.2 μmsec for rewriting one screen was provided.

According to this invention, there can be provided an active matrix type ferroelectric liquid crystal element capable of displaying a large volume of images, which has a wide visual angle, and displays high contrast images with high reliability.

While only certain presently preferred embodiments have been detailed, and as will be apparent with those skilled in the art, certain changes and modifications can be made without departing from the scope of the invention as defined by the following claims.

What is claimed is:

1. A liquid crystal element comprising:

at least one scanning line at least one signal line perpendicular to said scanning line; and a liquid crystal cell having a pair of substrates provided with a switching device having a gate-electrode and a source-electrode, the liquid crystal cell disposed at a crossing point of said scanning and signal lines, and ferroelectric liquid crystal filling the liquid crystal cell;

wherein said scanning line is connected with the gate-electrode of the switching device, said signal line is connected with the source-electrode of the switching device, said scanning line transmits a signal to turn on the switching device and, simultaneously, said signal line transmits a multiple-value signal which becomes and remains at zero volts while the switching device is turned on.

2. The liquid crystal element of claim 1, wherein said multiple-value signal is a binary signal consisting of one portion corresponding to a desired display and another portion allowing a voltage applied to the liquid crystal cell to become and remain at 0 V.

3. The liquid crystal element of claim 1, wherein said multiple-value signal is a ternary signal consisting of one portion corresponding to the desired display, another portion having a polarity opposite to said one portion corresponding to the desired display, and another portion allowing a voltage applied to the liquid crystal to become and remain at 0 V.

4. A liquid crystal of claim 2 or claim 3, wherein said switching device is formed of a thin film transistor.

5. A liquid crystal of claim 4, wherein said thin film transistor is formed of amorphous silicon or polysilicon.

6. The liquid crystal element of claim 1, wherein said pair of substrates include orientation films formed thereon, said substrates having undergone uniaxial orientation processing and arranged so that directions of said uniaxial orientation processing for each substrate are substantially parallel; and said ferroelectric liquid crystal shows a chevron structure which bends in a dogleg shape as a layer structure when said ferroelectric liquid crystal shows a chiral smectic C phase, and molecules of said ferroelectric liquid crystal being arrayed in a field between a lightning defect and a hairpin defect appear to follow said lightning defect and oppose said directions of said uniaxial orientation processing.

7. The liquid crystal element of claim 6, wherein the pre-tilt angle on the interface of said ferroelectric liquid crystal on the orientation film varies within the scope of 8° or more and 30° or less.

8. A liquid element, comprising:

a liquid crystal cell filled with a ferroelectric liquid crystal, said liquid crystal cell having a pair of substrates and a switching device, said switching device having a first electrode and a second electrode, said switching device switching to an on-state when a scanning signal is received at said first electrode, and said switching device controlling a display state of said liquid crystal cell based on a display signal received at said second electrode when in said on-state, said display signal having a first portion with a voltage other than zero and a second portion with a voltage substantially zero, said second electrode receiving said second portion of said display signal during said on-state.

9. The liquid crystal element of claim 8, further comprising:

a scanning line connected to said first electrode, said scanning line supplying said scanning signal; and a signal line connected to said second electrode, said signal line supplying said display signal.

10. The liquid crystal element of claim 8, wherein said first portion of said display signal has a voltage corresponding to a desired display state of said liquid crystal cell.

11. The liquid crystal element of claim 8, wherein said first portion of said display signal includes a first component having a voltage corresponding to an undesired display state of said liquid crystal cell and a second component having a voltage corresponding to a desired display state of said liquid crystal cell.

12. The liquid crystal element of claim 11, wherein said voltage of said first component is of opposite polarity from said voltage of said second component.

13. The liquid crystal element of claim 8, wherein said switching element is a thin film transistor, a gate electrode of said thin film transistor being said first electrode, and a source electrode of said thin film transistor being said second electrode.

14. A liquid crystal display device, comprising:

a plurality of liquid crystal cells arranged in rows and columns, each liquid crystal cell being filled with a ferroelectric liquid crystal, each liquid crystal cell having a pair of substrates and a switching device, said switching device having a first electrode and a second electrode, said switching device switching to an on-state when a scanning signal is received at said first electrode, and said switching device controlling a display state of said liquid crystal cell based on a display signal received at said second electrode when in said on-state;

a plurality of scanning lines, each scanning line being connected to said first electrodes of a row of said liquid crystal cells, said scanning lines sequentially supplying a scanning signal for a predetermined period of time; and a plurality of signal lines, each signal line being connected to said second electrodes of a column of said liquid crystal cells, each signal line supplying a display signal during the supply of a scanning signal, said display signal having a first portion with a voltage other than zero and a second portion with a voltage substantially zero, said second portion of said display signal being supplied prior to expiration of said predetermined period of time.

15. A liquid crystal element of claim 14, wherein said first portion of said display signal has a voltage corresponding to a desired display state of a corresponding liquid crystal cell.

16. A liquid crystal element of claim 14, wherein said first portion of said display signal includes a first component having a voltage corresponding to an undesired display state of a corresponding liquid crystal cell and a second component having a voltage corresponding to a desired display state of said corresponding liquid crystal cell.

17. A liquid crystal element of claim 16, wherein said voltage of said first component is of opposite polarity from said voltage of said second component.

18. A liquid crystal element of claim 14, wherein said switching element is a thin film transistor, a gate electrode of said thin film transistor being said first electrode, and a source electrode of said thin film transistor being said second electrode.

19. A liquid crystal display device, comprising:

a plurality of liquid crystal cells arranged in rows and columns, each liquid crystal cell being filled with a ferroelectric liquid crystal, each liquid crystal cell having a pair of substrates and a switching device, said switching device having a first electrode and a second electrode, said switching device switching to an on-state when a scanning signal is received at said first electrode, and said switching device controlling a display state of said liquid crystal cell based on a display signal received at said second electrode when in said on-state;

a plurality of scanning lines, each scanning line being connected to said first electrodes of a row of said liquid crystal cells, said scanning lines sequentially supplying a scanning signal for a predetermined period of time; and a plurality of signal lines, each signal line being connected to said second electrodes of a column of said liquid crystals, each signal line supplying a display signal during the supply of a scanning signal, said display signal being a multiple-value signal which becomes and remains at zero volts prior to expiration of said predetermined period of time.

20. A method of driving a liquid crystal element comprising the steps of:

(a) supplying a scanning signal to a first electrode of a liquid crystal cell's switching device to switch said switching device to an on-state, said liquid crystal cell being filled with a ferroelectric liquid crystal and having a pair of substrates; and (b) supplying a display signal to a second electrode of said switching device during said on-state of said switching device, said display signal being a multiple-value signal which becomes and remains at zero volts prior to expiration of said on-state.

21. A method of driving a liquid crystal element, comprising the steps of:

(a) providing a liquid crystal cell filled with a ferroelectric liquid crystal, said liquid crystal cell having a pair of substrates and a switching device, said switching device having a first electrode and a second electrode, said switching device switching to an on-state when a scanning signal is received at said first electrode, and said switching device controlling a display state of said liquid crystal cell based on a display signal received at said second electrode when in said on-state, (b) supplying said first electrode with a scanning signal to switch said switching device to said on-state for a predetermined period of time; and (c) supplying a display signal to said second electrode, said display signal being a multiple-value signal which becomes and remains at zero volts prior to expiration of said on-state.

22. The method of claim 21, wherein said step (b) includes supplying a display signal which initially has a voltage corresponding to a desired display state of said liquid crystal cell and then becomes and remains at zero volts prior to expiration of said on-state.

23. The method of claim 21, wherein said step (b) includes supplying a display signal which initially has a voltage corresponding to an undesired display state of said liquid crystal cell, then has a voltage corresponding to a desired display state of said liquid crystal cell, and then becomes and remains at zero volts prior to expiration of said on-state.

24. A method of forming and driving a liquid crystal element comprising the steps of:

(a) providing a pair of substrates;

(b) forming orientation films on said pair of substrates;

(c) performing uniaxial processing on said pair of substrates;

(d) arranging said pair of substrates so that directions of said uniaxial orientation processing for each substrate are substantially parallel;

(e) forming a liquid crystal cell by injecting, between said pair of substrates, a ferroelectric liquid crystal showing a chevron structure which bends in a dogleg shape as a layer structure when said ferroelectric liquid crystal shows a chiral smectic C phase, and molecules of said ferroelectric liquid crystal arrayed in a field between a lightning defect and a hairpin defect appearing to follow said lightning defect and oppose said directions of said uniaxial orientation processing;

(f) providing a switching device for said liquid crystal cell, said switching device having a first electrode and a second electrode;

(g) supplying a scanning signal to said first electrode to switch said switching device to an on-state; and (h) supplying a display signal to said second electrode during said on-state of said switching device, said display signal being a multiple-value signal which becomes and remains at zero volts prior to expiration of said on-state.

25. A method of driving a liquid crystal display device comprising the steps of:

(a) providing a plurality of liquid crystal cells arranged in rows and columns, each liquid crystal cell being filled with a ferroelectric liquid crystal, each liquid crystal cell having a pair of substrates and a switching device, said switching device having a first electrode and a second electrode, said switching device switching to an on-state when a scanning signal is received at said first electrode, and said switching device controlling a display state of said liquid crystal cell based on a display signal received at said second electrode when in said on-state;

(b) providing a plurality of scanning lines, each scanning line being connected to said first electrodes of a row of said liquid crystal cells;

(c) providing a plurality of signal lines, each signal line being connected to said second electrodes of a column of said liquid crystals;

(d) sequentially transmitting, via said scanning lines, a scanning signal for a predetermined period of time; and (e) transmitting, via each signal line, a display signal during said transmission of a scanning signal, said display signal being a multiple-value signal which becomes and remains zero prior to expiration of said predetermined period of time.

* * * * *